US008520250B2

(12) United States Patent
Imaizumi

(10) Patent No.: US 8,520,250 B2
(45) Date of Patent: Aug. 27, 2013

(54) IMAGE READING APPARATUS AND METHOD, AND COMPUTER-READABLE RECORDING MEDIUM

(75) Inventor: Yuuki Imaizumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 847 days.

(21) Appl. No.: 12/207,558

(22) Filed: Sep. 10, 2008

(65) Prior Publication Data

US 2009/0066988 A1 Mar. 12, 2009

(30) Foreign Application Priority Data

Sep. 12, 2007 (JP) ................................. 2007-236741
Jul. 14, 2008 (JP) ................................. 2008-182848

(51) Int. Cl.
*G06F 3/12* (2006.01)
*G06K 15/00* (2006.01)
*H04N 1/00* (2006.01)
*H04N 1/04* (2006.01)

(52) U.S. Cl.
USPC ....... 358/1.16; 358/1.13; 358/1.14; 358/1.15; 358/402; 358/404; 358/426.05; 358/437; 358/474

(58) Field of Classification Search
None
See application file for complete search history.

(56) References Cited

U.S. PATENT DOCUMENTS 5,812,283 A * 9/1998 Tachibana et al. ............ 358/444
5,930,003 A * 7/1999 Kondo ........................... 358/404
6,839,148 B1 * 1/2005 Matsuzoe et al. ............ 358/1.15
2002/0080420 A1 * 6/2002 Yokochi ........................ 358/471
2006/0103895 A1 * 5/2006 Kohara ......................... 358/474
2006/0192986 A1 * 8/2006 Suzuki ......................... 358/1.13
2007/0177225 A1 * 8/2007 Morishita ..................... 358/474

FOREIGN PATENT DOCUMENTS

| JP | 4-7957 | | 1/1992 |
| JP | 7-212516 | | 8/1995 |
| JP | 8-336020 | | 12/1996 |
| JP | 11239251 | * | 8/1999 |
| JP | 2003-283777 A | | 10/2003 |
| JP | 3701621 | | 10/2005 |

OTHER PUBLICATIONS

Wada Atsushi; "Image reader and Image reading method"; JP Pub date Aug. 31, 1999; Machine translation in english of the JP Pub 11-239251.*
Machine trasnslation in english of JP Pub 11-239251 to Wada Atsushi.*
Japanese Office Action dated Apr. 3, 2012.
Japanese Office Action dated Nov. 6, 2012.

* cited by examiner

*Primary Examiner* — Benny Q Tieu
*Assistant Examiner* — Haris Sabah
(74) *Attorney, Agent, or Firm* — IPUSA, PLLC

(57) ABSTRACT

An image reading apparatus includes a reading image unit that reads an image data of a document; a memory that writes the image data obtained by the reading image unit in a space region of the memory; a memory managing unit that determines whether the space region larger than a predetermined memory size of the memory exists; and a reading operation control unit that manages reading image operation and interruption of the reading image unit for a reading section of the document having a unit data size corresponding to an amount of the image data being writable in the predetermined memory size; wherein the memory management determines whether or not the space region larger than the predetermined memory size exists in the memory.

12 Claims, 10 Drawing Sheets

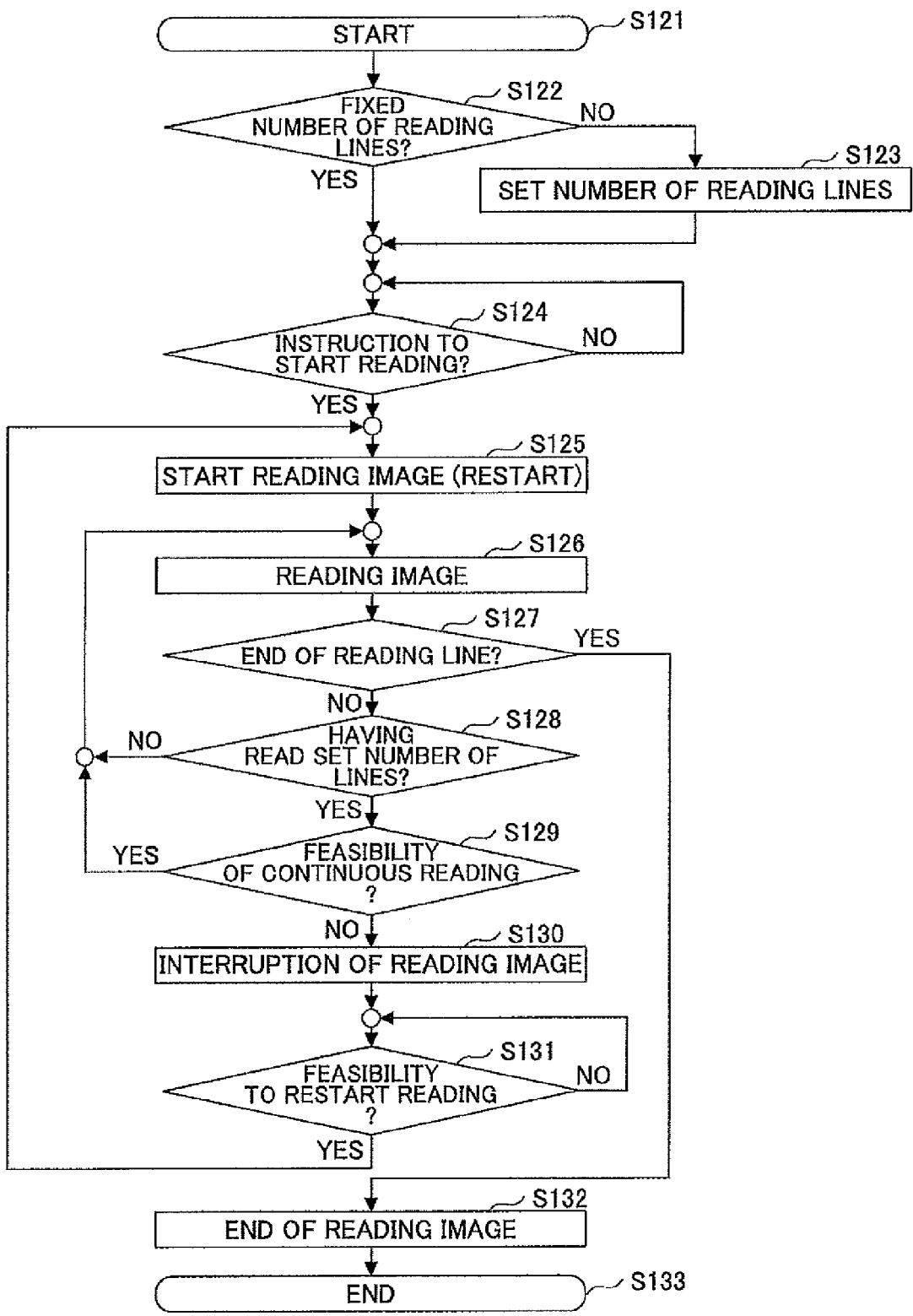

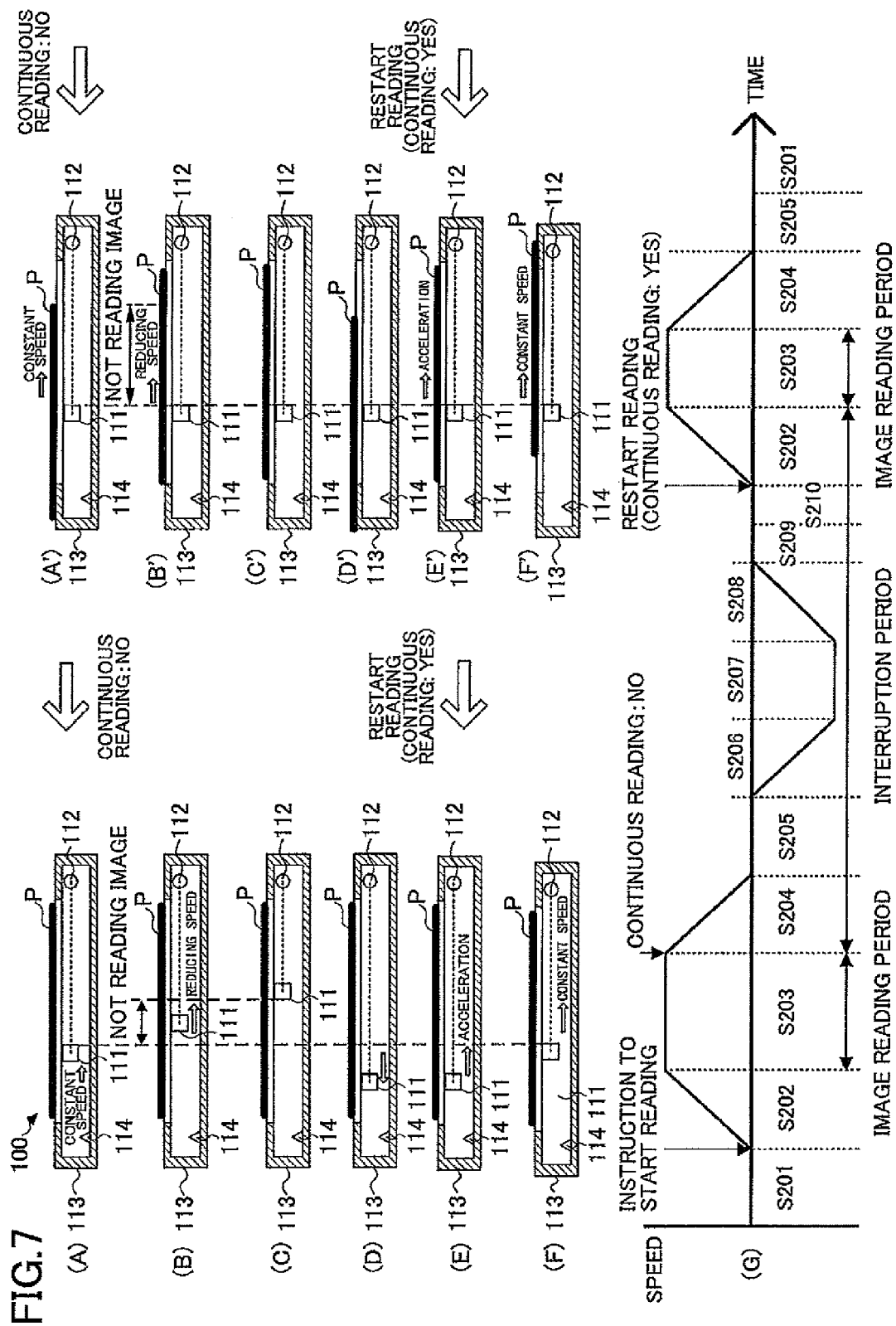

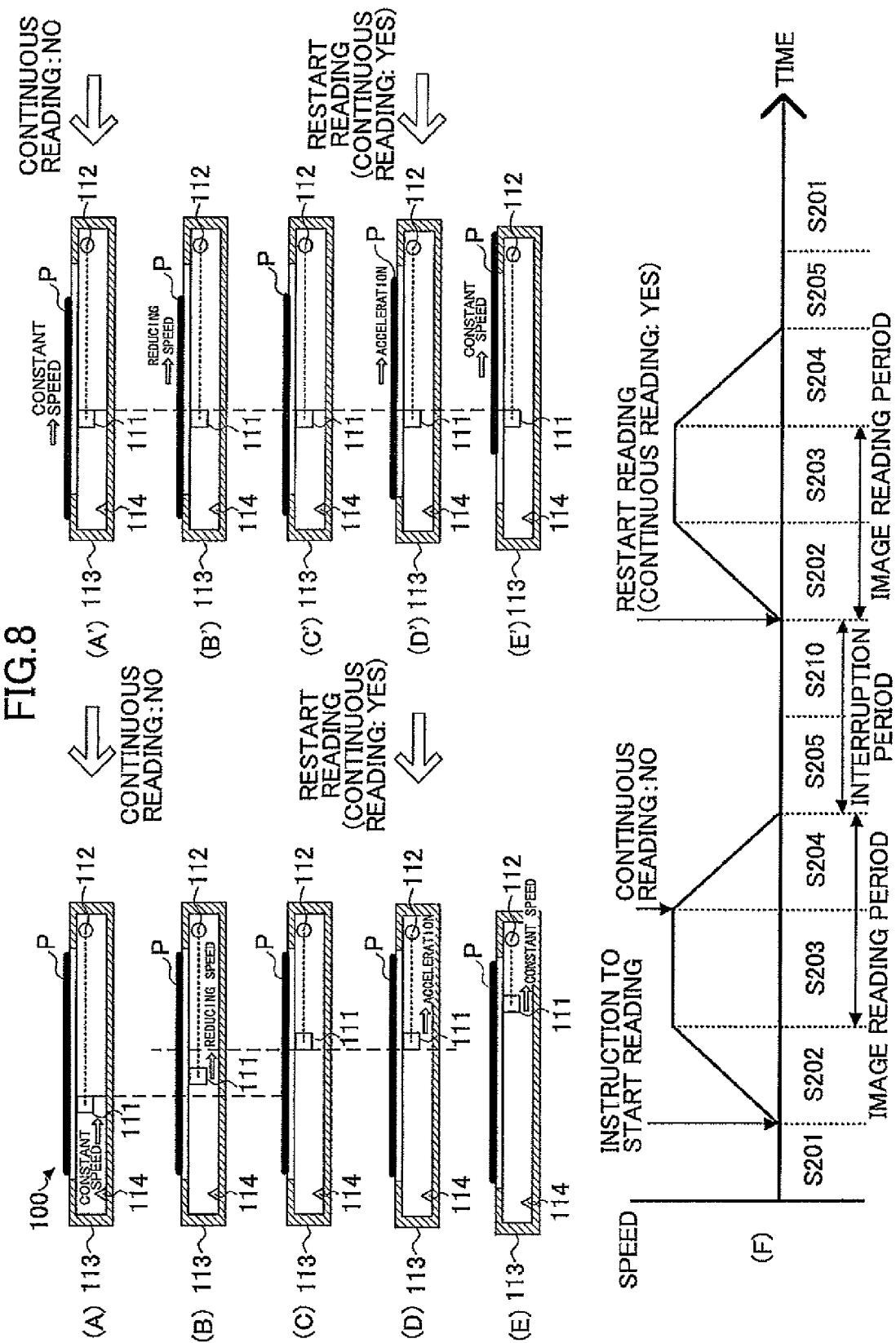

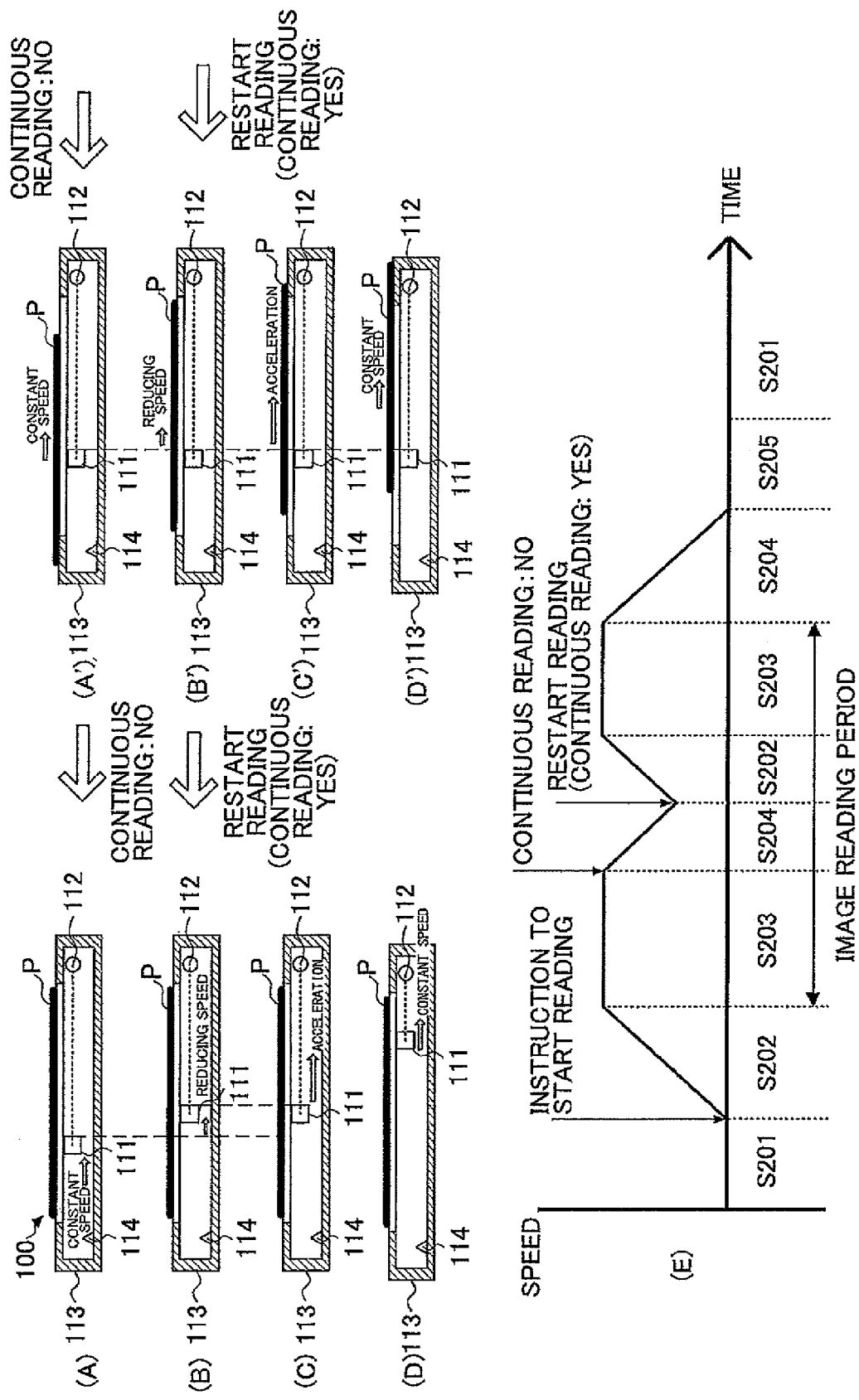

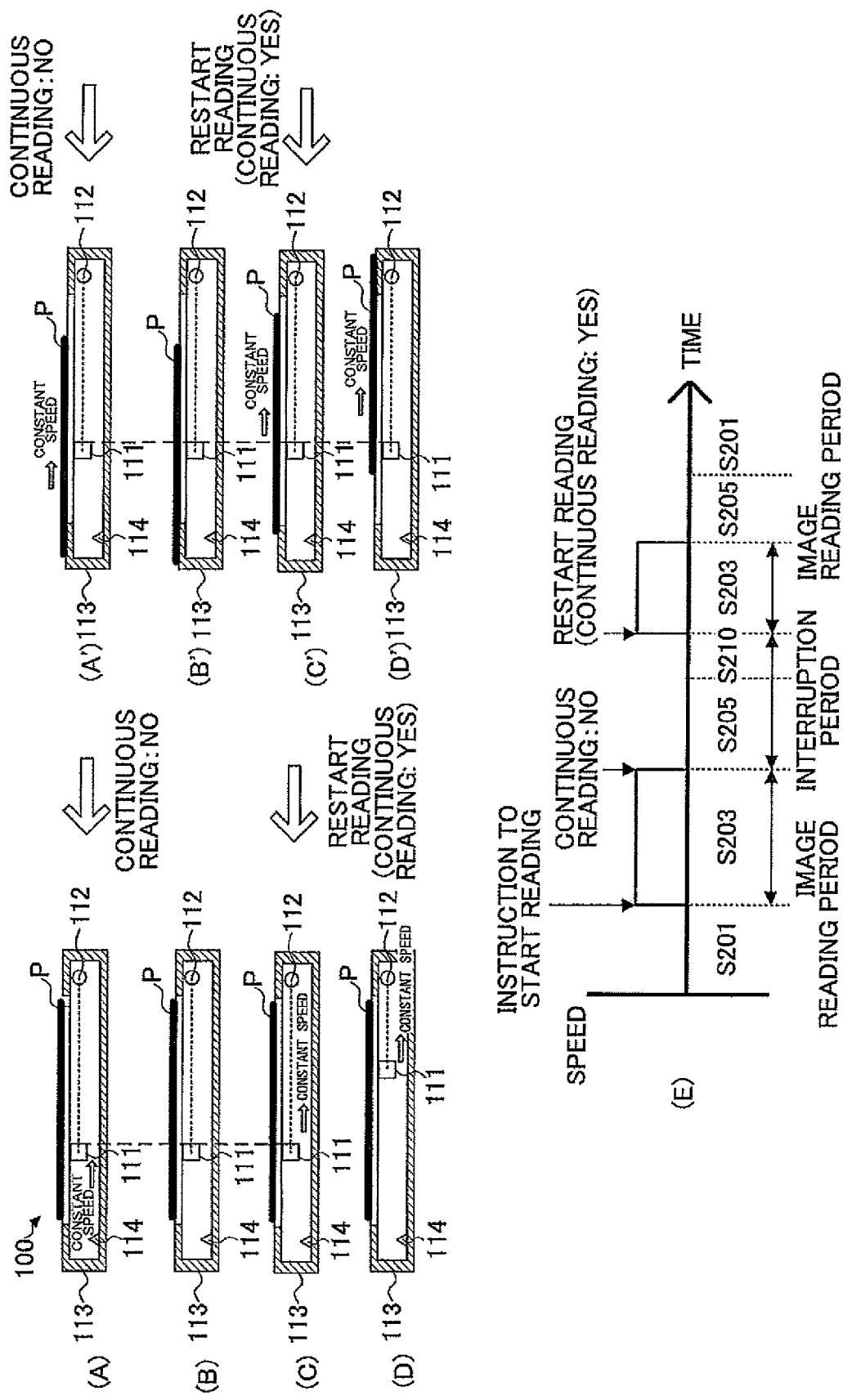

IMAGE READING APPARATUS AND METHOD, AND COMPUTER-READABLE RECORDING MEDIUM

BACKGROUND OF THE INVENTION

1. Field of the Invention

This invention relates to an image reading apparatus constituting a copy machine, a scanning processing unit of an MFP (Multi Function Printer) or a single scanner apparatus.

2. Description of the Related Art

In general, for such an image reading apparatus (described above), when the image reading apparatus reads a document, image data read by an image reading unit is first written in a memory, and then a high level processing part or an external device (personal computer or the like) reads the written image data.

In this case, the reason for using the memory is because the image reading speed of the image reading unit does not always match with the reading speed of the high level processing part or the reading speed of the external device. When a sufficient memory size is provided for image data to be read, the image data is continuously written in a predetermined region of the memory, and the high level processing unit or the external device reads the image data from the region of the memory. In this case, any size of image data can be read from a document without interruption of reading image data as long as memory size is not limited.

However, using large capacity memory causes an increase in cost of an apparatus, and thus the memory size used needs to be limited when minimum cost is required to design the apparatus. In that case, the memory writes, like a ring buffer, image data in the memory from a top address of the memory one after another up to an end address of the memory, and then the memory returns to the top address again and continuously writes the image data on which the high level processing unit or the external device has completed reading data so that there is a space region available for writing data.

Also, when the high level processing unit or the external device is delayed, the reading of image data needs to be intermittent to avoid overflowing of the memory because writing image data cannot be performed for the memory region which still includes unread data.

FIG. 1 is a flowchart to show processing in a conventional image reading apparatus. When the apparatus determines that the memory is full (in case, available memory area is insufficient) and further data processing cannot be performed, the reading of image data is interrupted so that the apparatus restarts reading image data when available memory area for writing data is generated after the high level processing unit or the external device have read the unread data. This intermittent data reading technique is indicated in the figure (e.g. see patent document 1, Japanese Patent No. 3701621).

When processing is started by turning on of the power supply of the apparatus in step S1 in FIG. 1, the process waits for an instruction to start reading from the operation panel or the like in step S2 and restarts reading image data operation when receiving instruction to start reading at step S3.

Further, at step S4, the reading of image data (writing image data in the memory) is performed, and at step S5, the process determines whether there is an end of reading position (identically determined by number of lines from the reading start) and if there is no end of reading position, the process determines whether the memory is full at step S6. If the memory is not full, the process continues reading image data in step S4.

If a "memory full" condition has occurred, a reading stop signal is generated in step S7 and the reading of image data is interrupted at step S8. After that, the processing determines at step S9 whether the reading of image data can restart because the memory full is resolved, and if possible, the processing channels (restart the reading of image instructions) the reading stop signal in step S3 and restarts the reading image operation.

Further, when the reading of image data is determined to reach an end of reading position at step S5, the processing stops the reading image data at step S10, and the entire process finishes at step S11.

A conventional image reading apparatus described above performs intermittent control of the reading of image data so as not to generate overflow of memory. However there is a problem in that an overflow of memory may occur for the following reason.

(1) In a conventional intermittent reading technique, when a controlling block of an intermittent command cannot transmit an intermittent operation command (a reading stop signal) for any reason, load increase of CPU, for example, image data to be written in storage device exceeds tolerance of memory, so that overflow of the memory occurs. In that case, the process stops by failed error, and thus the reading operation needs to interrupt.

(2) In a conventional intermittent reading technique, when a "memory full" condition is generated (when it is determined that the following processing cannot be performed), reading of image data is switched to an interruption. If a data delay block occurs between the reading image unit and the memory (when an image processing unit exists, for example), the data delay block may cause memory overflow. Thus, when the data delay block includes data which is larger than an available space area of the memory, new reading of image data is not performed by interruption of the reading of image data, and an overflow of memory is caused by delayed writing data in the memory. Also, when the data delay block is an image processing unit, an enlargement of an image or the like may increase the amount of data by several times, and this increase in the data may enhance the possibility of the overflow of memory.

This invention takes such conventional problems into account. One aspect of the invention provides an image reading apparatus which can avoid overflow of the memory when there is limitation that the memory is smaller than memory size needed for reading image data of one page, enabling the reading of any size of image data.

SUMMARY OF THE INVENTION

One aspect of the present invention may provide an image reading apparatus including a reading image unit that reads an image data of a document; a memory that writes the image data obtained by the reading image unit in a space region of the memory; a memory managing unit that determines whether the space region larger than a predetermined memory size of the memory exists; and a reading operation control unit that manages reading image operation and an interruption of the reading image unit for a reading section of the document having a unit data size corresponding to an amount of the image data being writable in the predetermined memory size; wherein when the memory managing unit determines that the space region larger than the predetermined memory size exists in the memory, the reading operation control unit causes the reading image unit to read another image data of a following reading section of the document, and when the memory managing unit determines that the space region larger than the predetermined memory size is absent, the reading operation control unit causes the reading image unit to finish reading the image of the reading section of the document and interrupts the reading image operation of the reading image unit.

According to another aspect of the present invention, an image reading method includes the steps of: (a) reading image data of a document using a reading image unit; b) writing the image data obtained by the reading image unit in a space region of a memory; (c) managing the memory for determining whether the space region of larger than a predetermined memory size of the memory exists using a memory managing unit; and (d) managing reading image operation and interruption of the reading image unit for a reading section of the document having a unit data size corresponding to an amount of image data being writable in the predetermined memory size using a reading operation control unit; wherein when the memory managing unit determines that the space region larger than the predetermined memory size exists in the memory, the reading operation control unit causes the reading image unit to read another image data of a following reading section of the document, and when the memory management determines that the space region larger than the predetermined memory size is absent while reading the reading section, the reading operation control unit causes the reading image unit to finish reading the image data of the reading section of the document and interrupts the reading of the image operation of the reading image unit.

According to another aspect of the present invention, a computer-readable recording medium having instructions executable by a computer to execute an image reading control method includes the steps of: (a) reading image data of a document using a reading image unit; (b) writing the image data obtained by the reading image unit in a space region of a memory; (c) managing the memory for determining whether the space region of larger than a predetermined memory size of the memory exists using a memory managing unit; and (d) managing reading image operation and an interruption of the reading image unit for a reading section of the document having a unit data size corresponding to an amount of image data being writable in the predetermined memory size using a reading operation control unit; wherein when the memory managing unit determines that the space region larger than the predetermined memory size exists in the memory, the reading operation control unit causes the reading image unit to read another image data of a following reading section of the document, and when the memory management determines that the space region larger than the predetermined memory size is absent while reading the reading section, the reading operation control unit causes the reading image unit to finish reading the image data of the reading section of the document and interrupt reading the image operation of the reading image unit.

For an image reading apparatus of this invention, a memory is evaluated to determine whether there is a memory space larger than predetermined size. Managing of reading image operation or interruption of the reading image data is performed for a unit reading section which corresponds to an amount of image data being able to be written in the space region. When there is such a space region (a memory space), a new reading image operation is performed for a following reading section, and when there is no space region, the reading image operation is interrupted by completing the reading image operation for the current reading section. The present invention has the following advantages over the prior art.

(1) There is no signal actively instructing the interruption of the reading image data, so that there is no situation for which a block managing intermittent order cannot transmit an intermittent operation order by some occasions. Thus there is no memory overflow caused by such occasions.

(2) Even if there is a delayed data block caused by some occasions between a reading image unit and a memory, no memory overflow occurs because the reading section is designed by taking account of delays caused by such delayed data block and additional amount of data.

(3) Even if there is a limitation for available memory size which is less than memory size to read image of one page document, no memory overflow occurs and any size of image data can be read.

Other objects, features and advantages of the present invention will become more apparent from the following detailed description when read in conjunction with the accompanying drawings.

BRIEF DESCRIPTION OF THE DRAWINGS

FIG. 6 is a flowchart to show an example of processing in the reading of image data;

FIG. 7 is a drawing showing an example (case 1) of operation of a reading image unit;

FIG. 8 is a drawing showing an example (case 2) of operation of a reading image unit;

FIG. 9 is a drawing showing an example (case 3) of operation of a reading image unit; and FIG. 10 is a drawing showing an example (case 4) of operation of a reading image unit.

DETAILED DESCRIPTION OF THE PREFERRED EMBODIMENTS

In the following, preferred embodiments of this invention are described.

<Apparatus Constitution>

Figure 1:
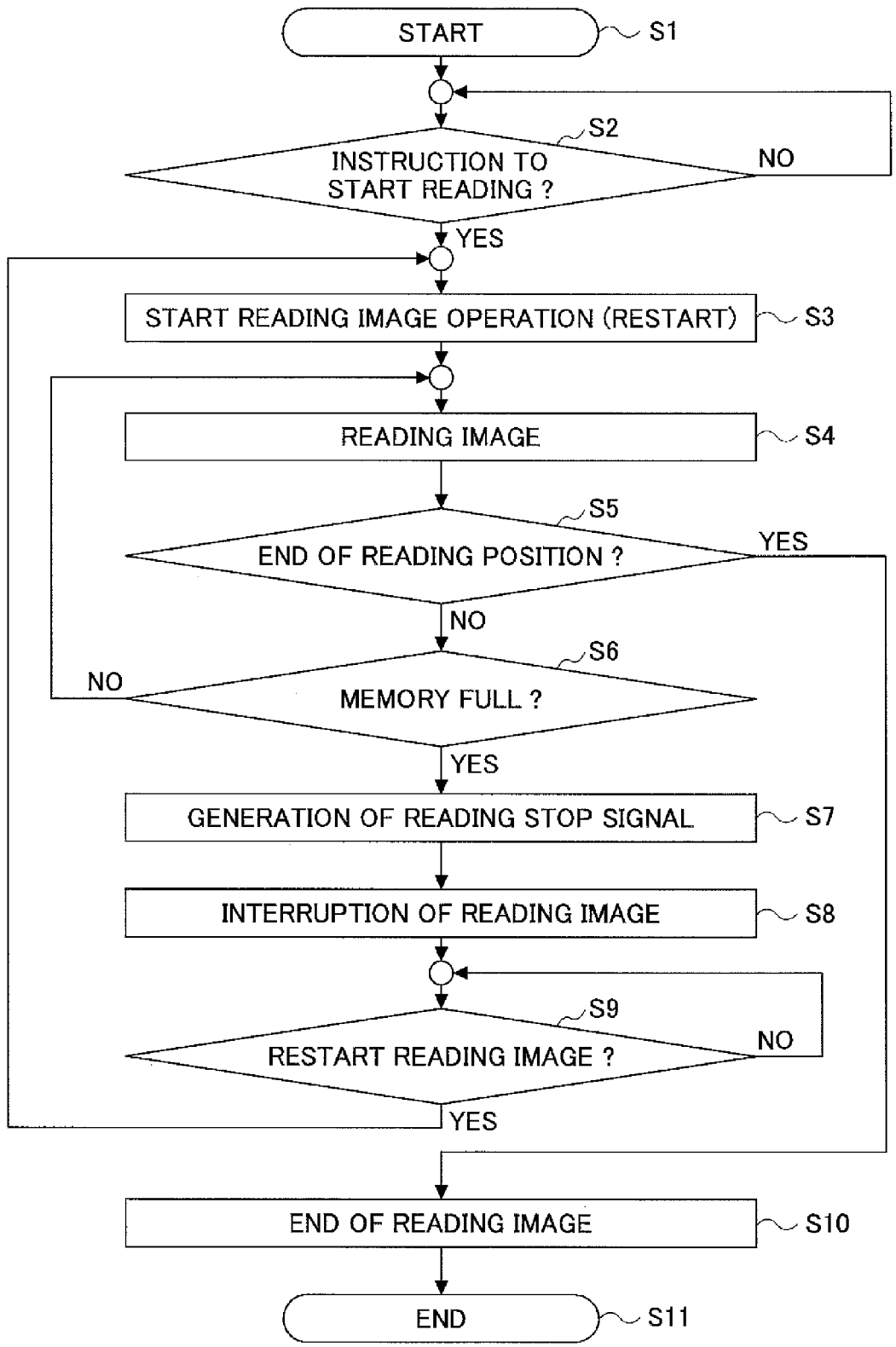
FIG. 1 is a flowchart to show processing in a conventional image reading apparatus.
Figure 2:
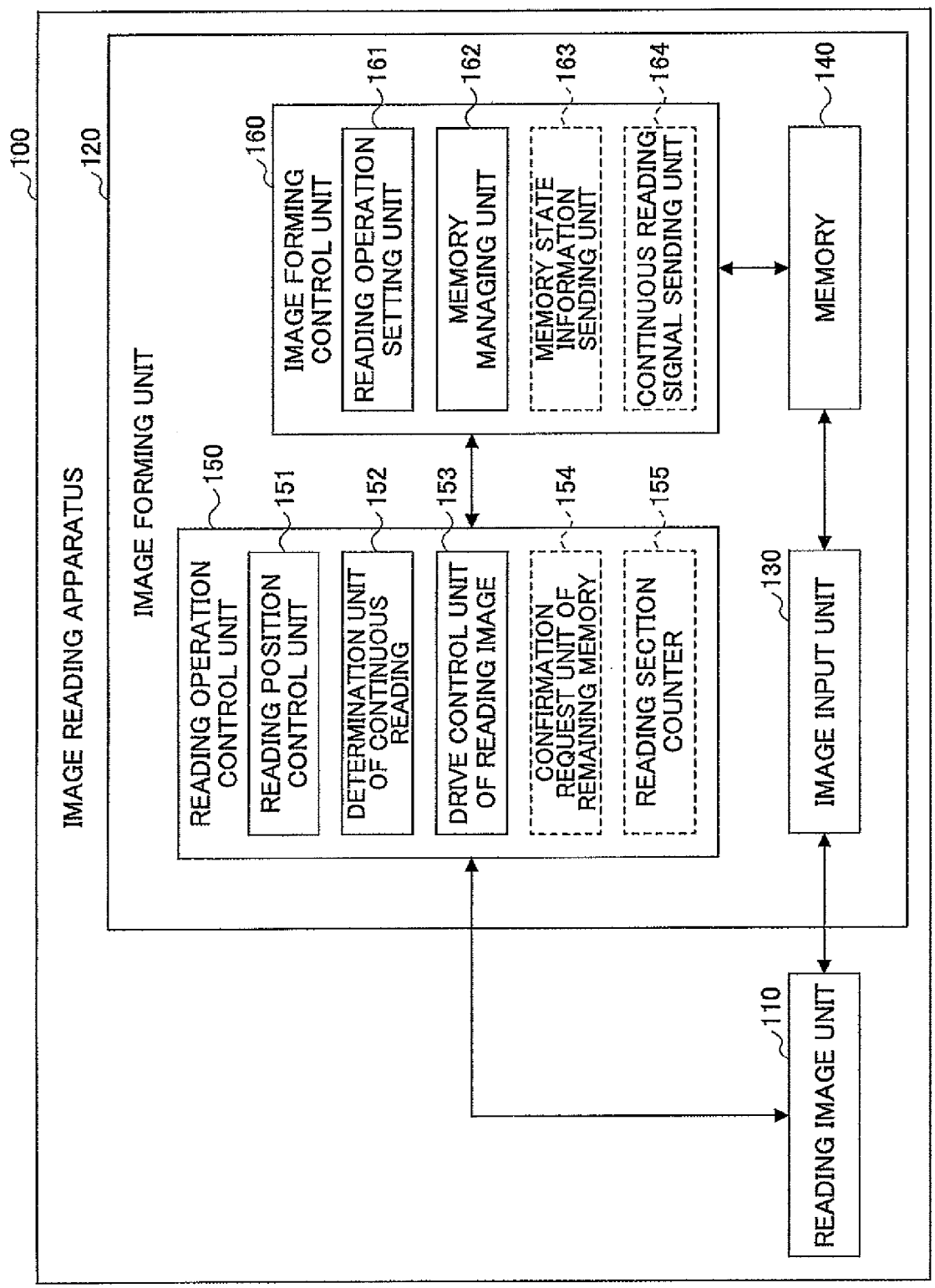
FIG. 2 is a functional block diagram showing an example of constitution of an image reading apparatus relating to an embodiment of this invention.

FIG. 2 is a functional block diagram showing an example of a constitution of an image reading apparatus relating to an embodiment of this invention.

In FIG. 2, an image reading apparatus 100 includes a reading image unit 110 and an image forming unit 120.

The reading image unit 110 optically reads an input document by a reading sensor or the like such as a CCD (Charge Coupled Device) or a CIS (Contact Image Sensor) and is a part to convert the input document into electronic data. The reading image method includes a flat bed method (FB method) reading image data while a document is fixed and moves a reading sensor, and an auto document feeder method (ADF method) reading image data by moving a document for a fixed reading sensor.

The image forming unit 120 outputs data converted from the image read by the reading image unit 110 into a form that can be output, and includes an image input unit 130, a memory 140, a reading operation control unit 150; and an image forming control unit 160.

The image input unit 130 processes to write in image data input by the reading image unit 110 in the memory 140. Also, the image input unit 130 may perform image processing of line compensation, shading compensation and filtering process for the input image data.

The memory 140 holds image data written by the image input unit 130. According to an available space region, a process step is evaluated to determine whether to advance to an interruption of intermittent control. When the reading image unit 110 reads a predetermined size (predetermined number of lines) of data, if there is a sufficient space region in the memory 140, the reading operation is continued; if there is no sufficient space region in the memory 140, the reading operation is interrupted for the intermittent control.

The reading operation control unit 150 controls a motor or the like of the reading image unit 110 for operation control of the reading of image data.

The image forming control unit 160 establishes reading image operation of the reading operation control unit 150 and manages the space region of the memory 140 or the like.

The reading operation control unit 150 and the image forming control unit 160 are performed by computer hardware and computer software (program) running on the computer hardware.

The reading operation control unit 150 includes a reading position control unit 151, a determination unit of continuous reading 152, a drive control unit of reading image 153, a confirmation request unit of remaining memory 154 and a reading section counter 155.

The reading position control unit 151 manages a document scanning position of the reading image unit 110. Scanning of the document is performed by the line order and manages how many lines are read from the reading start position.

The determination unit of continuous reading 152 determines whether to interrupt the reading operation managed by the reading position control unit 151 when the reading image position reaches a predetermined number of lines. Further, the predetermined number of lines may be a fixed number, may be determined by setting of the image forming control unit 160, or may be determined by a dynamic setting.

The drive control unit of reading image 153 performs driving control of the drive control of reading image unit 110 in response to setting of an image forming control unit 160.

The confirmation request unit of the remaining memory 154 is used when the reading operation control unit 150 instructs the image forming control unit 160 to acquire information of a memory state, and is not used (needed) when the information of a memory state is sent from the image forming control unit 160 in a one-way direction or a continuous reading signal is sent from the image forming control unit 160 with a one-way direction (a reading continuation signal method as described below) in response to the memory condition.

The reading section counter 155 is used when the determination unit of continuous reading 152 judges whether to interrupt the reading of image data based on a reading section counter system (unnecessary if a reading section counter method is not used). In that case, a reading section counter 155 indicates (holds) the remaining number of sections (one section a predetermined number of lines) to read, making a countdown when data of an amount of one reading section is read or written in the memory 140 and counting up when a memory space region corresponding to an amount of one section (one bank) becomes free.

The image forming control unit 160 includes a reading operation setting unit 161, a memory managing unit 162, a memory state information sending unit 163 and a continuous reading signal sending unit 164.

The reading operation setting unit 161 establishes operation setting for the reading operation control unit 150. Setting items, for example, include reading the size of an image, resolution, selection of monochromatic/color or the like.

The memory managing unit 162 manages a space region of the memory 140. As a method of memory management, for example, there is a bank management or the like which divides a memory region into plural blocks.

The memory state information sending unit 163 transmits information of a memory state managed in the memory managing unit 162 when receiving a request (or without waiting for the instruction) from the confirmation request unit of remaining memory 154 of the reading operation control unit 150. In the case of using a continuous reading signal method, the memory state information sending unit 163 is not necessary.

If a reading continuation signal system is used, as described later, the continuous reading signal sending unit 164 transmits a reading continuation signal to the reading operation control unit 150, when there is a space region corresponding to a reading section according to a memory state (condition) managed by the memory managing unit 162.

<Outline of Operation>

The reading image unit 110 drives a reading sensor (CCD, CIS) or a document by motors, reads image data for one page of document by scanning one side of a document, and transmits the read image data to image input unit 130. The reading operation control unit 150 controls a motor of the reading image unit 110, a reading sensor, and AFE (Analog Front End) digitizing analog image data according to setting of the image forming control unit 160.

The image input unit 130 writes data in the memory 140 after performing image processing for the image data input from the reading image unit 110 when necessary and accumulates image data.

Also, the reading operation control unit 150 controls intermittent reading operation based on a state of the reading section counter 155 or a reading continuation signal transmitted by the image forming control unit 160.

<Reading Section in Intermittent Reading Operation>

Figure 3:
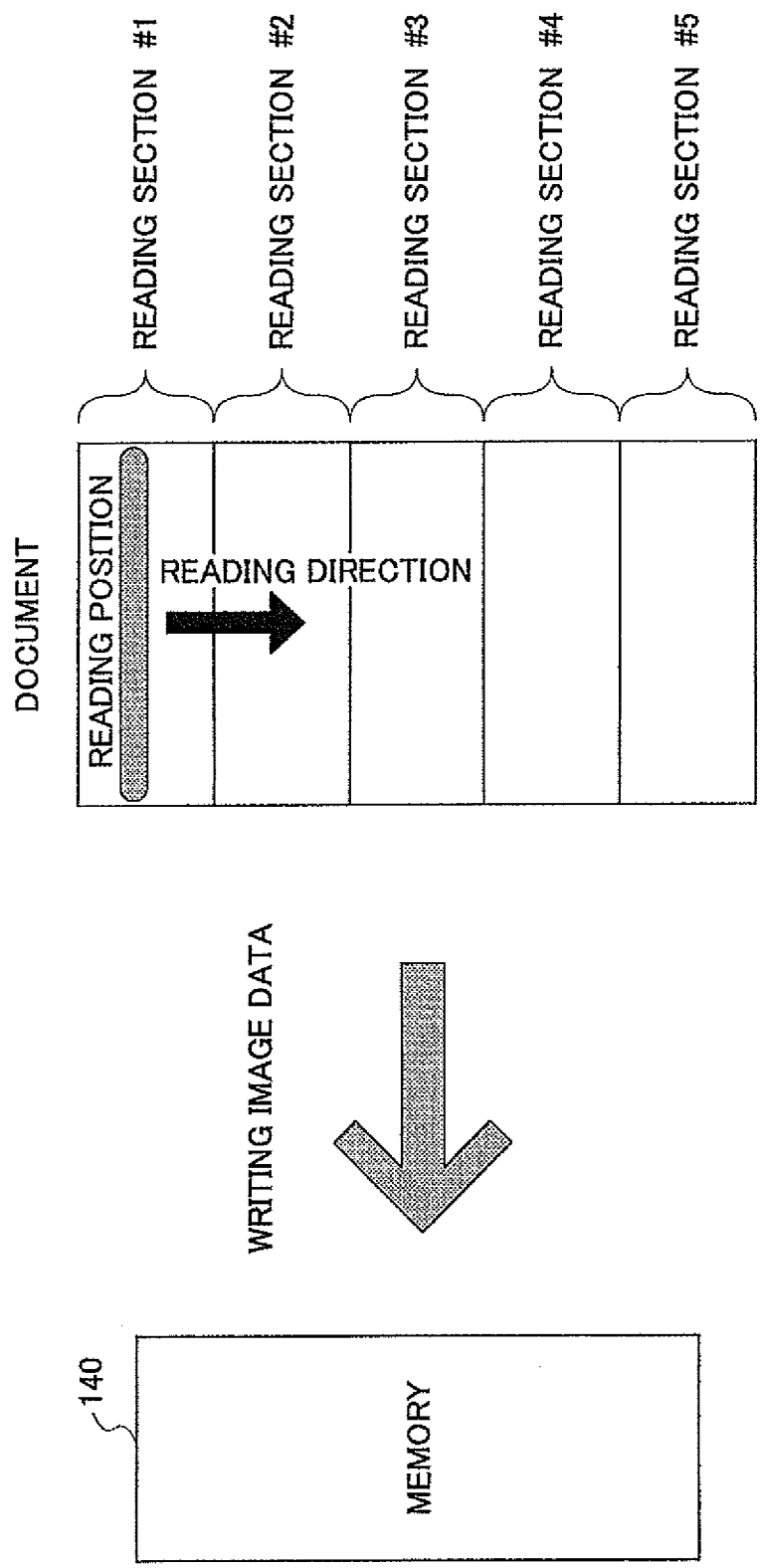
FIG. 3 is an illustration of a reading section.

FIG. 3 is an illustration of a reading section, showing an example which divides a document into five reading sections #1-#5. By setting a quantity of image data divided as one reading section smaller than the region of one memory bank, no overflow occurs for reading only one section. In short, the memory can read image without overflow if processing interrupts the reading of image data at every end of the reading of one reading section. However, when the setting of a reading section is improper, a reading speed of a document becomes slow because of the interruption of the reading of image data, and then it is desirable to set a number of reading lines corresponding to a reading section in an appropriate value. Setting the number of reading lines is described later.

In FIG. 3, once the reading of image data starts, the reading of image data at the reading section #1 is performed first. Further, the read image data is written in the memory 140. However, an amount of the read image data does not always correspond to an amount of data written in the memory 140. This occurs because there are line compensation, shading compensation and a filtering process or the like performed to the read image data.

While the reading of image data is performed for the reading section #1, if a memory space of a memory bank equivalent to the space of next one section cannot be confirmed (reading continuation: no), the reading of image data is interrupted when the reading of image data of the reading section #1 is finished. While the interruption of the reading of image data occurs, a space of the memory bank equivalent to one section is confirmed (reading continuation: yes), the reading of image data restarts and performs reading image data of the reading section #2.

Further, if a space of the memory bank equivalent to next one section (reading continuation: yes) is confirmed while reading image data at the reading section #1, the reading of image data is not interrupted and continuously performs the reading of image data for the reading section #2 because the memory does not cause overflow even if image data is written in the reading section #2. This process continues until the reading process reaches the end of reading position.

<Confirmation of Memory Space Region>

Figure 4:
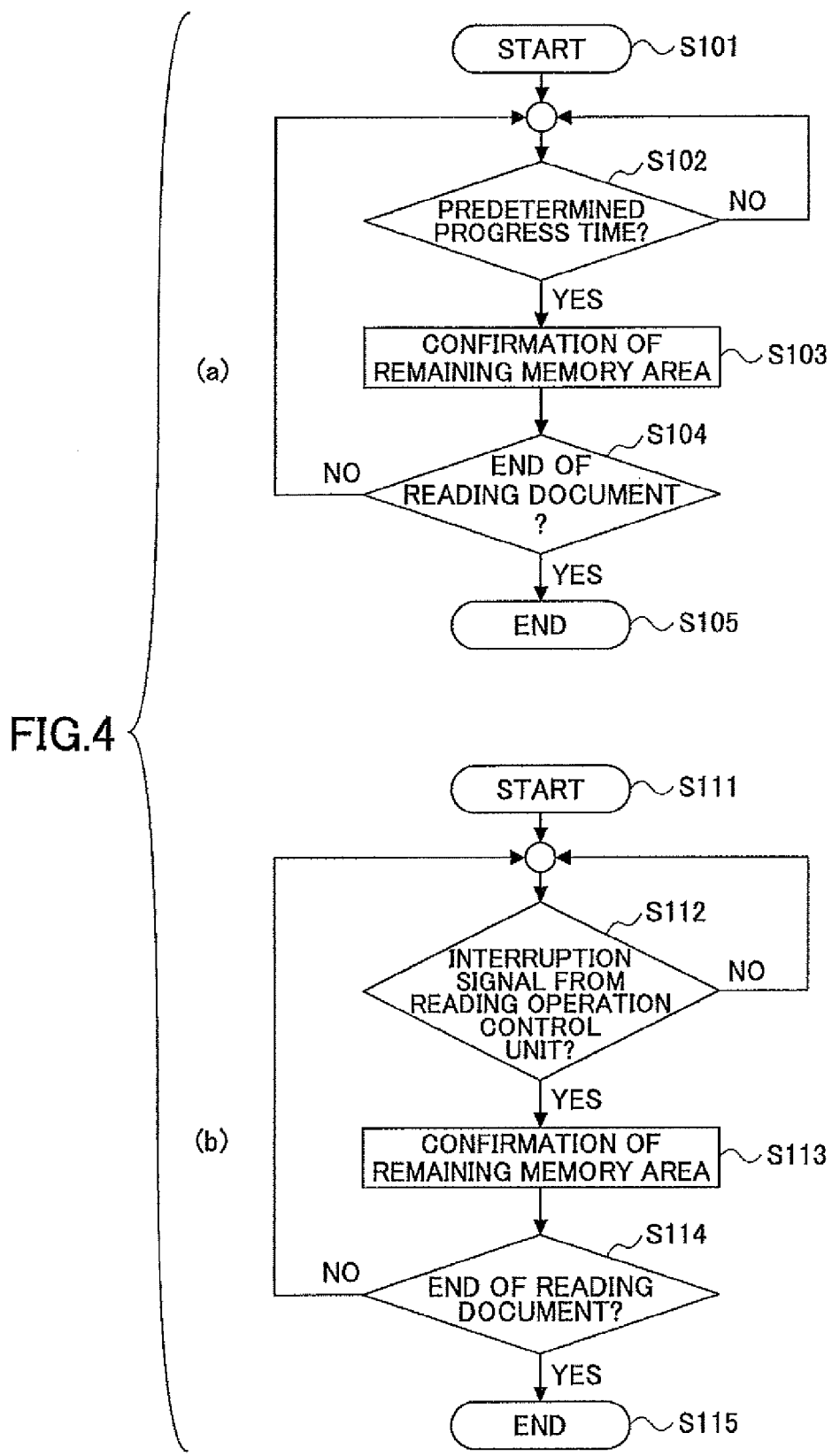
FIG. 4 is a flowchart to show a processing example of confirmation of a memory space (memory space region)

FIG. 4 is a flowchart to show a processing example of a memory space region confirmation, which is a confirmation method to determine whether the memory bank is released in the memory 140 to allow the memory managing unit 162 of image forming control unit 160 (FIG. 2) to write image data for one section in the memory 140.

FIG. 4(a) is an example of performing memory space region confirmation by using a polling method. When the memory managing unit 162 starts processing in step S101, the process stays at step S102 for a predetermined time period, and confirmation of a memory space region is performed at step S103 when the predetermined time period has passed.

Next, the memory managing unit 162 determines whether reading document is finished in step S104, and if the reading document is not finished, the process stays at step S102 for a predetermined time period. When the reading document is finished, the processing is finished at step S105.

FIG. 4(b) is an example of performing confirmation of the remaining memory space (area) by an interruption management method. When the memory managing unit 162 starts processing in step S111, the process stays at step S112 for a predetermined time period until receiving an interruption signal from the reading operation control unit 150 at step S112, and confirmation of a memory space region is performed at step S113 after having received the interruption signal.

Next, the memory managing unit 162 judges whether document reading is finished in step S114 and returns to a wait of an interrupt signal of step S112 when the document reading is not finished. When document reading has finished, the processing is finished at step S115.

<Determination of Right/Wrong for Reading Continuation by Intermittent Reading Operation>

Figure 5:
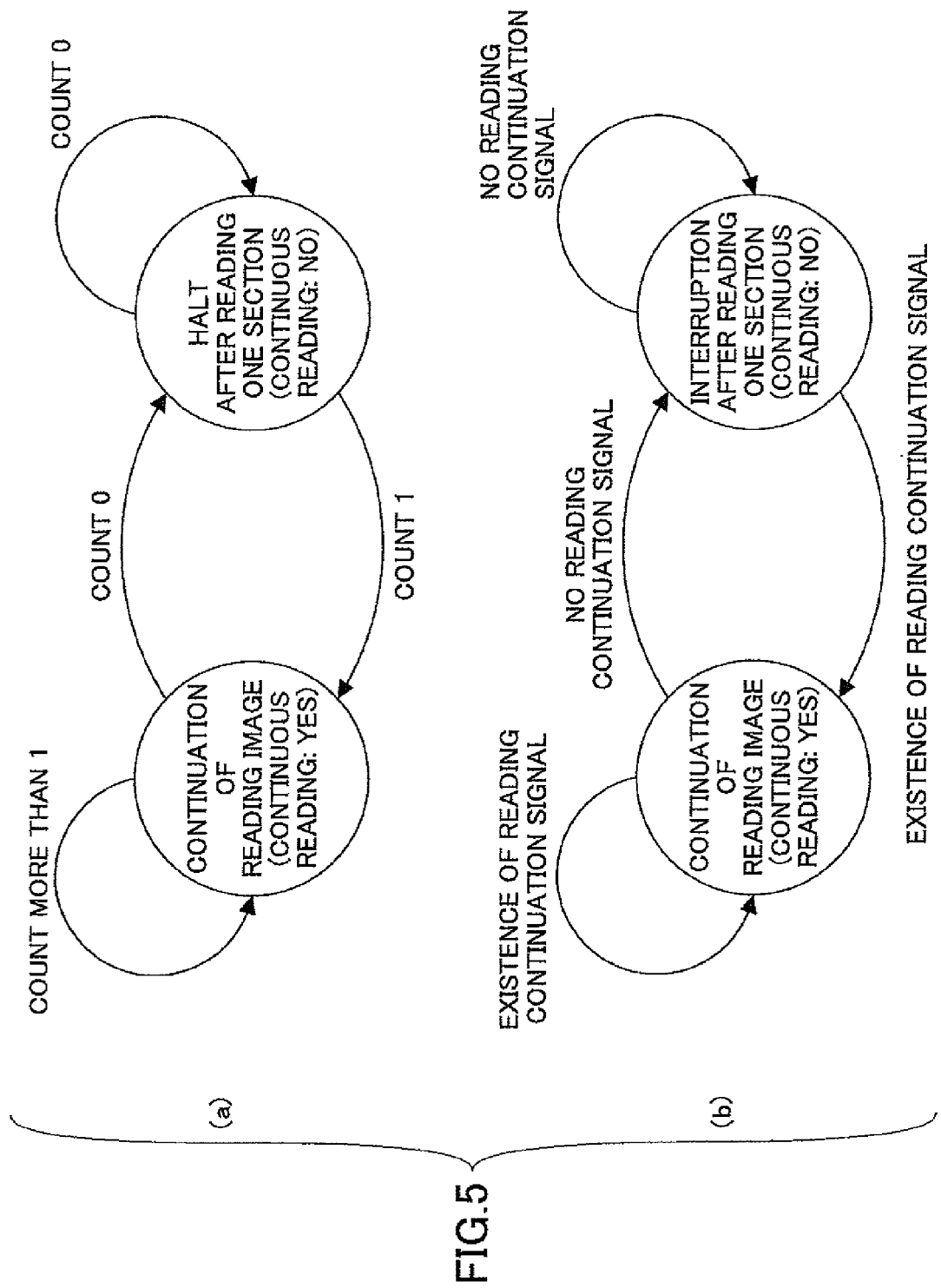
FIG. 5 is a drawing of state transition to show an example of technique of determination of right or wrong for continuous reading.

FIG. 5 is a state transition diagram showing an example technique of the determination of right or wrong for continuous reading.

FIG. 5(a) is a state transition diagram for a reading section count method, in which the correctness to continuing to read of image data is determined by the reading of the section counter 155 in the reading operation control unit 150 (FIG. 2). The reading section counter 155 indicates how many sections are left for the reading of image data, indicating that if the reading section counter 155 indicates more than 1, then continuation of the reading of image data is possible, and if the reading section counter 155 is 0, then continuation of the reading of image data is not allowed. When continuation of the reading of image data is possible (allowed), no interruption is made and the reading of image data is performed for the next section. When continuation of the reading of image data is not allowed, an interruption of the processing is made when reading has finished for that current section.

As an increase and decrease method (or control method) of the reading section counter 155, for example, when the reading image unit 110 completes reading data for one section then the reading section counter 155 may make a countdown. When the memory bank of the memory 140 capable of accumulating data for an amount of one section is released, then the reading section counter 155 may count up. Also, when image data of one section has accumulated in the memory 140 and the reading section counter 155 may make a countdown, and when the memory bank of the memory 140 capable of accumulating data for an amount of one section has been released, then the reading section counter 155 may count up.

FIG. 5(b) is a state transition diagram of a reading continuation signal method. A reading continuation signal is transmitted to the reading operation control unit 150 from the continuous reading signal sending unit 164 of the image forming control unit 160. If the reading operation control unit 150 receives a reading continuation signal while reading image data at a certain section, the reading operation control unit 150 judges that continuation of the reading of image data is possible, and performs the reading of image data of the next section without interruption. If the reading operation control unit 150 does not receive a reading continuation signal, the reading operation control unit 150 judges that continuation of the reading of image data is denied and interrupts the reading of image data before the end of a current section.

As a control method of a continuation of reading image signal, if the memory 140 has not released a memory bank to allow writing an amount of data for one section, the reading operation control unit 150 may judge that there is no continuation of reading image signal. Also, the reading operation control unit 150 may transmit an interrupt signal judging whether to continue the reading operation to the image forming control unit 160 at uniform intervals, and when the image forming control unit 160 receives the interrupt signal and if a memory bank to allow writing data of a quantity for one section is opened in the memory 140, the reading operation control unit 150 may transmit a reading continuation signal. If there is no memory bank released, then the reading operation control unit 150 need not to transmit a reading continuation signal.

<Processing in Reading Image>

FIG. 6 is a flowchart to show a processing example in the reading of image data.

In FIG. 6, once a processing (controlled by the reading operation control unit) starts with turn-on of power supply of the apparatus at step S121, at step S122 for judging if reading section needs to be established, the processing determines whether a number of lines corresponding to a section (reading section) that allows the reading of image data without interruption is fixed or not by using a reading line number setting unit. In short, the processing judges whether no problem has occurred for a fixed number of lines preset in factory shipment and all selectable modes which can be chosen with the apparatus using the reading line number setting unit. For example, when the fixed number of lines is read, the processing judges whether writing data does not exceed capacity of a memory bank even for an enlarged mode. If no problem occurred for the fixed number of lines, the processing transfers to the next process without interruption. If there is a problem, a proper number of reading lines is established in step S123. The number of lines to be established is determined by considering the reading document size, the reading resolution, an image data storing method into the memory 140, an amount of data per line to be written in the memory 140, or the like, using the reading line number setting unit.

Next, at step S124, the process waits for an instruction to start reading from an operation panel or the like. The instruction to start reading includes pushing a scan start button of an apparatus, a command from PCs (Personal Computer) connected via serial I/F (USB) to a network (Ether Net (registered trademark)) and the like. Further when there is an instruction to start reading, the processing starts reading image data at step S125.

Next, at step S126, the process performs the reading of image data (with writing of image data to the memory) in step S126. A FB method moves a reading sensor and an ADF system moves a document to perform reading of image data by line orders, and the read image is accumulated in the memory 140.

Next, in step S127, the process determines whether the current reading point is the end of a reading position of a reading point corresponding to the end of a reading section. If the reading position is not the end of the reading position, the process determines at step S128 whether reading of predetermined (set) number of lines has been finished. If the reading of the predetermined number of lines has not finished, the reading of image data is continued at step S126.

When the reading of the predetermined number of lines has been finished, step S129, the process judges the correctness of reading continuation based on a value of the reading section counter 155 or presence of a reading continuation signal from the image forming control unit 160. If the reading continuation is right (or correct), at step S126, the reading of image data is continued for the next section without interruption. If the reading continuation is wrong (or incorrect), the processing performs interruption, when image reading for the current section is finished at step S130.

After step 130, the process holds interruption until reading continuation becomes right or correct at step S131. Reading continuation becomes right when a value of the reading section counter 155 becomes more than 1 or a reading continuation signal is received from the image forming control unit 160. When reading continuation becomes right (possible), the interruption of the reading of image data is removed at step S125 and the process restarts the reading of image data of the next section.

And when the process has reached the end of reading position at step S127, the processing finishes the reading of image data at step S132 and finishes the entire processing at step S133.

When the processing reads the predetermined number of lines and reaches the end of a reading section, the processing judges the right or wrong of reading continuation at step S129 and continues reading image data without interruption for the next reading section at step S126 if reading continuation is right. Further, the process may perform interruption of the reading of image data once and after that, may restart the reading of image data.

<Operation of Reading Image Unit>

For the FB method, when the reading of image data starts or restarts, moving of a reading sensor is accelerated up to a constant speed. When the reading of image data stops or makes an interruption in the process, the moving speed of the reading sensor is reduced and stopped. In that case, as a general rule, reading image data operation is performed while the moving speed of a reading sensor is constant. In short, reading image operation is not performed while the moving speed of the reading sensor is being reduced. Further, reading image operation may be performed while a reading sensor is being accelerated or decelerated, although some reading quality of an image is reduced to some extent. Also, in a case of using a stepping motor, where moving speed of the reading sensor may be regarded as immediately reaching a constant speed, and then the reading sensor may be immediately moved without acceleration or stopped without deceleration.

In the case of an ADF method, a document is moved instead of the reading sensor. In a general ADS method, the reading of image data is performed while the document is being accelerated and decelerated.

FIGS. 7-10 are drawings showing operation examples of the reading image unit 110.

FIG. 7 shows an operation example in which the reading of image data is performed at a constant speed and is not performed at all while the reading sensor or the document is moved under acceleration or deceleration. In the figure, (A)-(F) of FIG. 7 indicate operation states of a mechanism part for a FB method, (A')-(F') of FIG. 7 indicate operation states of a mechanism part for an ADF method, (G) indicates variations of speed of the reading sensor or speed of the document. Further, a mechanism part of the image reading apparatus 100 includes a motor 112 to drive this reading sensor 111 in the right and left directions of the figure, a housing 113, and a home position sensor 114 provided inside this housing 113 and determining a standard position of the reading sensor 111.

FIGS. 7(A)-(F) and FIGS. 7(A')-7(F') indicate the following operation state.

(A),(A'): When the reading sensor 111 or document P moving at constant speed has performed reading of predetermined number of lines, and the reading sensor 111 starts reducing the speed for interruption because reading continuation is denied.

(B),(B'): The reading sensor 111 or document P gradually reduces its speed, and this time, the reading of image data is not performed.

(C),(C'): The reading sensor 111 or document P is stopped. The stopped position and a position to restart reading of the reading sensor 111 or the document P is different.

(D),(D'): The reading sensor 111 or document P returns in the direction opposite to the previous progress direction by a certain distance. The distance that the reading sensor 111 or document P returns to is determined by considering acceleration time before the reading sensor 111 or document P reaches a constant speed.

(E),(E'): Acceleration of reading sensor 111 or document P is performed for restart of reading.

(F),(F'): The reading sensor 111 or document P reaches a constant speed and starts the reading of image data again.

Operation for each period of state in FIG. 7(G) is described below. The intermittent operation is performed only one time in the figure. However, plural intermittent operations may be performed.

S201: Stop State

A reading operation ready state is indicated and is transferred to S202 by instruction to start reading.

S202: Front Acceleration State

This is a period that the reading sensor 111 or the document P accelerates in a progress direction. When the moving speed reaches a predetermined value, the state is transferred to S203.

S203: Constant Speed for Front State

The reading sensor 111 (or, document P) goes to a progress direction in constant speed. The reading of image data is performed in this state. After reading a predetermined number of lines, the state is transferred to S204 if continuous reading indicates being denied.

S204: Front Deceleration State

The reading sensor 111 or document P decelerates from the constant speed for a progress direction. When the speed becomes zero, the state transfers to S205.

S205: Front Hold State

The reading sensor 111 or document P stops, and is ready for changing to the next state.

S206: Backward Acceleration State

The reading sensor 111 or document P accelerates in an opposite direction from a progress direction. When the reading sensor 111 or document P reaches a predetermined speed, the state transfers to step S207.

S207: Backward Constant Speed State

The reading sensor 111 or document P progresses at constant speed in an opposite direction for a progress direction. When the reading sensor 111 or document P progresses for a predetermined number of lines, the step transfers to S208.

S208: Backward Deceleration State

The reading sensor 111 or document P decelerates an opposite direction for a progress direction. When progress speed becomes zero, the process transfers to S209.

S209: Backward Hold State

The reading sensor 111 or document P stops, and the process waits until the process transfers to the next state.

S210 Intermittent Hold State

The reading sensor 111 or document P stops. When continuous reading becomes possible, reading is restarted and the process moves to S202.

FIG. 8 is an operation example of performing the reading of image data in acceleration and deceleration of a reading sensor or document. In the figure, (A)-(E) of FIG. 8 indicate operation states of a mechanism part for ADF method, (A')-(E') of FIG. 8 indicate operation states of a mechanism part for ADF method. FIG. 8 (F) shows a speed variation of the reading sensor or document for time.

FIGS. 8(A)-8(E) and FIGS. 8(A')-8(E') indicate the following operation states.

(A),(A'): When the reading sensor 111 or document P moving at constant speed has read a predetermined number of lines, continuous reading is denied, and then the reading sensor 111 or document P starts decelerating.

(B),(B'): The reading sensor 111 or document P gradually reduces speed. The reading of image data can be performed during deceleration unlike a normal reading image operation.

(C),(C'): The reading sensor 111 or document P is stopped. A position where the reading sensor 111 or document P stopped and the place the reading sensor 111 or document P restarts reading become the same. Therefore, the reading sensor 111 or document P do not need to return for a predetermined distance in the opposite direction to the previous progress direction.

(D),(D'): In order to restart reading, the reading sensor 111 or document P performs acceleration from the stopped position. Also while accelerating, the reading sensor 111 or document P performs the reading image of data unlike a normal reading image operation.

(E),(E'): The reading sensor 111 or document P moves in constant speed after reaching constant speed.

The description for each period in FIG. 8(F) is similar in the case of FIG. 7 (G). In this method, as the reading sensor 111 or document P performs reading image operation while accelerating or decelerating, the reading sensor 111 or document P does not move to an opposite course for a progress direction.

FIG. 9 is an operation example of performing a reading of image data in deceleration of a reading sensor or document without interruption. In the figure, (A)-(D) indicate operation states of a mechanism part for an ADF method, (A')-(D') indicate operation states of a mechanism part for an ADF method. FIG. 8 (E) shows a speed variation of the reading sensor or document for time. For the reading sensor 111 or document P performing the reading of image data while accelerating or decelerating, the reading sensor 111 or document P can continue to read image data without interruption when the reading sensor 111 or document P restarts reading while decelerating speed.

FIGS. 9(A)-9(D) and FIGS. 9(A')-9(D') indicate the following states.

(A),(A') The reading sensor 111 or document P moving at constant speed has read a predetermined number of lines, and the reading sensor 111 or document P starts decelerating for interruption because continuous reading is denied.

(B),(B'): The reading sensor 111 or document P gradually reduces the speed. Reading image data is performed while decelerating unlike the usual reading image operation.

(C),(C'): For a case where continuous reading become possible (right) while the reading sensor 111 or document P is decelerating, the reading sensor 111 or document P stops decelerating and starts accelerating. During this period, the reading of image data is performed. Further, for restarting of the reading while the reading sensor 111 or document P decelerates, the reading sensor 111 or document P may be interrupted once and starts accelerating again.

(D),(D'): The reading sensor 111 or document P has reached at a constant speed and continuously drives (moves) at the constant speed.

Each period described in FIG. 9(E) is similar to the case of FIG. 7(G). In this case, however, reading image operation is performed while the reading sensor 111 or document P is decelerating, so that the reading sensor 111 or document P does not move toward an opposite direction to a progress direction.

FIG. 10 is an example of operation of moving a reading sensor or document at constant speed without interruption for restarting of the reading of image data, restarting, and the reading of image data, or without acceleration and deceleration of the reading sensor or document for the finishing operation.

In the figure, (A)-(D) indicate operation states of a mechanism part for an ADF method, (A')-(D') indicate operation states of a mechanism part for an ADF method. FIG. 10 (E) shows a speed variation of the reading sensor or document for time.

FIGS. 10(A)-10(D) and FIGS. 10(A')-10(D') indicate the following states.

(A),(A'): The reading sensor 111 or document P moving at a constant speed has read a predetermined number of lines, and starts transferring an interruption because continuous reading is denied.

(B),(B'): The reading sensor 111 or document P is in an interruption period. In this case, the reading sensor 111 or document P stops without deceleration unlike the usual reading image operation case. Thus the stopped position of the reading sensor 111 or document P and the position to restart the reading of image data become the same.

(C),(C'): While interrupting the reading of image data, continuous reading becomes right (possible) and the reading sensor 111 or document P starts moving (driving) and reaches a constant speed without acceleration to restart reading operation.

(D),(D'): The reading sensor 111 or document P moves (drives) at a constant speed and performs the reading of image data.

Descriptions for each period in FIG. 10(E) is similar to the case of FIG. 7 (G). In this method, as the reading sensor 111 or document P performs reading image operation without acceleration and decelerating, the reading sensor 111 or document P does not move to an opposite course for a progress direction.

Four methods are shown in FIG. 7 through FIG. 10 for examples, however, they may be combined for operation.

So far, this invention is described based on preferred embodiments of the invention. Specific embodiments have been shown for describing the invention, however, it is clear that these embodiments may be modified and include variations without departing from the scope of this invention defined by claims. Therefore this invention is not limited to the specific examples and drawings in this specification.

The present invention is not limited to the specifically disclosed embodiments, and variations and modifications may be made without departing from the scope of the present invention.

The present application is based on Japanese Priority Applications No. 2007-236741 filed on Sep. 12, 2007, and No. 2008-182849 filed on Jul. 14, 2008, the entire contents of which are hereby incorporated herein by reference.

What is claimed is:

1. An image reading apparatus:
   a reading image unit configured to read an image data of a document that is divided into plural reading sections in one page, each of plural reading section including plural lines;
   a memory configured to write the image data obtained by the reading image unit in a space region of the memory;
   a memory managing unit configured to determine whether the space region larger than a predetermined size exists in the memory, the predetermined size corresponding to a memory size available to store the image data of one reading section; and
   a reading operation control unit configured to manage reading image operation and interruption of the reading image unit for one of the reading sections of the document;
   wherein the reading operation control unit includes a reading section counter configured to hold a counter value indicating how many reading sections can be read and stored in the memory further, and
   when the reading image unit finishes reading the image data of one of the reading section, the reading operation control unit determines whether to continue to read the image data based on the counter value of the reading section counter,
   wherein if the reading section counter indicates the counter value equal to or greater than 1, the reading operation control unit causes the reading image unit to read another image data of following one of the reading sections of the document, and
   if the reading section counter indicates the counter value of 0, the reading operation control unit causes the reading image unit to interrupt reading the image data, and when counter value changes equal to or greater than 1, the reading operation control unit causes the reading image unit to restart reading the image data,
   the image reading apparatus further comprising a reading lines number setting unit configured to determine a number of the plural lines included in the one reading section of the plural reading sections is fixed or not, and, if the number of plural lines is fixed and the fixed number of the plural lines causes a problem, the reading lines number setting unit establishes a proper number of plural lines included in one reading section of the plural reading sections based on the size of the document, a reading resolution or an amount data per line to be written in the memory, wherein the reading section including the plural lines correspond to an incremental or decremental unit of the reading section counter.

2. The image reading apparatus as claimed in claim 1, wherein the reading section counter counts down when the reading image unit has read one reading section, and counts up when a memory bank of the memory available to store an amount of data for the one reading section in the memory is released.

3. The image reading apparatus as claimed in claim 1, wherein the reading section counter counts down when the image data having the one reading section is stored in the memory, counts up when a memory bank of the memory available to store an amount of data for the one reading section in the memory is released.

4. The image reading apparatus as claimed in claim 1, wherein the memory managing unit includes a continuous reading signal sending unit that transmits a continuous reading signal to the reading operation control unit when the space region larger than the predetermined size exists in the memory.

5. The image reading apparatus as claimed in claim 4, wherein the continuous reading signal sending unit establishes the continuous reading signal being absence when the space region of the memory available to store an amount of data for the one reading section in the memory is unreleased.

6. The image reading apparatus as claimed in claim 4, wherein when the continuous reading signal sending unit has received an interruption signal from the reading operation control unit and the space region of the memory available to store an amount of data for the one reading section in the memory is released, the continuous reading signal sending unit transmits the continuous reading signal,
   wherein if the space region is not released, the continuous reading signal sending unit does not transmit the continuous reading signal.

7. The image reading apparatus as claimed in claim 1, wherein the reading line number setting unit that determines whether the image data read based on a number of reading lines preset in factory shipment is equal to or less than the predetermined size of the memory for all selectable modes to be chosen, and if the image data exceeds the predetermined size of the memory, the reading line number setting unit establishes the proper number of reading lines, and the reading operation control unit controls the reading section based on the established number of reading lines.

8. The image reading apparatus as claimed in claim 1, wherein the memory managing unit determines whether there is a memory space larger than the predetermined size of the memory at a predetermined timing.

9. The image reading apparatus as claimed in claim 1, wherein the memory managing unit determines whether the memory space larger than the predetermined size exists in the memory when receiving a request from the reading operation control unit.

10. An image reading method comprising the steps of:
   (a) reading image data of a document using a reading image unit, the document being divided into plural reading sections in one page, and each of the plural reading sections including plural lines;
   (b) writing the image data obtained by the reading image unit in a space region of a memory;
   (c) managing the memory for determining whether the space region larger than a predetermined size exists in the memory, the predetermined size corresponding to a memory size available to store the image data of one reading section; and
   (d) managing reading image operation and interruption of the reading image unit for the one of reading sections of the document;

wherein step (d) includes a counting step for managing a counter value indicating how many reading sections can be read and stored in the memory further, and when the reading image unit finishes reading the image data of one of the reading sections, it is determined in step (d) whether to continue to read the image data based on the counter value managed in the counting step, wherein if the counter value is equal to or greater than 1, the reading image unit reads another image data of following one of the reading sections of the document, and if the counter value is 0, the reading image unit interrupts reading the image data, and when the counter value changes to equal to or greater than 1, the reading image unit restarts reading the image data, the image reading method further comprising, before the step (a), a step of determining a number of the plural lines included in the one reading section of the plural reading sections is fixed or not, and if the number of the plural lines is fixed and the fixed number of the plural lines causes a problem, establishing a proper number of the plural lines included in the one reading section of the plural reading sections based on a size of the document, a reading resolution, or an amount of data per line to be written in the memory, wherein the reading section including the plural lines corresponds to an incremental or decremental unit of the counting step.

11. The image reading method as claimed in claim 10, wherein step (c) includes a continuous reading signal sending step of transmitting a continuous reading signal to step (d), and, in step (d), reading of the image and interruption of the reading image unit are managed based on the continuous reading signal received from the continuous reading signal sending step.

12. A non-transitory computer-readable recording medium having instructions executable by a computer to execute an image reading control method comprising the steps of:

(a) reading image data of a document using a reading image unit, the document being divided into plural reading sections in one page, and each of the plural reading sections including plural lines;

(b) writing the image data obtained by the reading image unit in a space region of a memory;

(c) managing the memory for determining whether the space region larger than a predetermined size exists in the memory, the predetermined size corresponding to a memory size available to store image data of one reading section; and (d) managing reading image operation and interruption of the reading image unit for the one of reading sections of the document;

wherein step (d) includes a counting step for managing a counter value indicating how many reading sections can be read and stored in the memory further, and when the reading image unit finishes reading the image data of one of the reading sections, it is determined in step (d) whether to continue to read the image data based on the counter value managed in the counting step, wherein if the counter value is equal to or greater than 1, the reading image unit reads another image data of following one of the reading sections of the document, and if the counter value is 0, the reading image unit interrupts reading the image data, and when the counter value changes to equal to or greater than 1, the reading image unit restarts reading image data, the image reading control method further comprising, before the step (a), a step of determining a number of the plural lines included in the one reading section of the plural reading sections is fixed or not, and if the number of the plural lines is fixed and the fixed number of the plural lines causes a problem, establishing a proper number of the plural lines included in the one reading section of the plural reading sections based on a size of the document, a reading resolution, or an amount of data per line to be written in the memory, wherein the reading section including the plural lines corresponds to an incremental or decremental unit of the counting step.

\* \* \* \* \*